United States Patent
Charlier et al.

(10) Patent No.: US 6,729,547 B1
(45) Date of Patent: May 4, 2004

(54) SYSTEM AND METHOD FOR INTERACTION BETWEEN AN ELECTRONIC WRITING DEVICE AND A WIRELESS DEVICE (75) Inventors: Michael L. Charlier, Palatine, IL (US); Daniel Wong, Wildwood, IL (US); Kenneth Allen Paitl, East Dundee, IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 10/331,733

(22) Filed: Dec. 30, 2002

(51) Int. Cl.⁷ ................................. G06K 7/10
(52) U.S. Cl. ................. 235/462.45; 235/462.49; 235/462.01; 235/382; 235/380; 235/440
(58) Field of Search ................. 235/462.49, 462.01, 235/382, 380, 440, 462.45

(56) References Cited

U.S. PATENT DOCUMENTS

| 3,949,233 A | | 4/1976 | Gluck |
| 4,146,782 A | | 3/1979 | Barnich |
| 4,329,684 A | | 5/1982 | Monteath et al. |
| 4,682,016 A | | 7/1987 | Inoue |
| 4,748,318 A | | 5/1988 | Bearden et al. |
| 5,369,262 A | * | 11/1994 | Dvorkis et al. ............ 345/179 |
| 5,880,452 A | | 3/1999 | Plesko |
| 5,932,860 A | | 8/1999 | Plesko |
| 5,952,643 A | | 9/1999 | Cravatts |
| 5,984,176 A | * | 11/1999 | Koda et al. .................. 235/376 |
| 6,050,490 A | * | 4/2000 | Leichner et al. ........ 235/462.49 |
| 6,246,482 B1 | | 6/2001 | Kinrot et al. |
| 6,330,057 B1 | | 12/2001 | Lederer et al. |
| 6,424,407 B1 | | 7/2002 | Kinrot et al. |
| 6,452,683 B1 | | 9/2002 | Kinrot et al. |
| 2002/0125325 A1 | * | 9/2002 | Plesko .................... 235/462.49 |

* cited by examiner

Primary Examiner—Thien M. Le
Assistant Examiner—Allyson N. Sanders
(74) Attorney, Agent, or Firm—Vedder, Price, Kaufman & Kammholz, P.C.

(57) ABSTRACT

A system and method for interaction between an electronic writing device (102) and a wireless device (104) includes the electronic device (102) being capable of generating a keystroke signal (106). The system and method further includes the wireless device (102) receiving the keystroke signal (106) and executing an operation (168) in response thereto. The electronic writing device (102) includes a motion sensor (110) that generates a motion displacement signal (116), a toggle switch (112) that generates an engagement signal (118), a pressure sensor (114) that generates a depression signal (120) and an optical sensor (128). The wireless device (102) includes a receiver (162) that receives the keystroke signal (106) and a processor (164) that executes an operation in response thereto or may provide for operating in a bar code mode, such that a bar code may be scanned and the keystroke signal including a bar code signal.

16 Claims, 8 Drawing Sheets

| DATEBOOK | NEW MSG | MUTE | PHONEBOOK | VIBRATE | SPEAKER | WEB |
|---|---|---|---|---|---|---|
| D  D | N | M  m | p  P | R  R | S | W |
| | | | | | 256 | BARCODE B |

*FIG. 12*

| EXIT PUNCHT MODE | PERIOD | COMMA | APOSTROPHE | QUESTION ? | DASH - |
|---|---|---|---|---|---|
| — | . | / | l | ? | — |
| EXCLAMATION ! | SLASH | LEFT PAREN ( | RIGHT PAREN ) | SEMI COLON ; | COLON : |
| l | / | C | ⊃ | / | V |
| QUOTE " | AMPERSAND & | AT @ | DOLLAR $ | PERCENT % | POUND # |
| N | 8 | O | S | ∞ | W |
| CARROT ^ | ASTERISK * | LESS THAN < | GREATER THAN > | UNDERLINE _ | PLUS + |
| ∧ | ∝ | C | ⊃ | = | ∞ |
| EQUAL = | PIPE \| | BACK SLASH \ | LEFT BRACKET { | RIGHT BRACKET } | LEFT BRACKET [ |
| Z | ∧ | \ | E | 3 | E |
| RIGHT BRACKET ] | TILDA ~ | | | | |
| 3 | N | | | | |

FIG. 15

SYSTEM AND METHOD FOR INTERACTION BETWEEN AN ELECTRONIC WRITING DEVICE AND A WIRELESS DEVICE

BACKGROUND OF THE INVENTION

The present invention relates generally to an electronic communication system and more specifically to wireless communication between an electronic writing device and wireless device.

With the growth of wireless devices, there is a concurrent growth with providing adaptability and improved ease of use and interactivity. The wireless device may be any device capable of receiving communication from a wireless or non-wireless device or network, a server or other communication network, including, but not limited to, a cellular phone, a laptop computer, a desktop computer, personal digital assistant (PDA), a pager, a smart phone, or any other suitable device as recognized by one having ordinary skill in the art to receive communication.

Another area of growth in electronic devices is the development of electronic writing devices. Initial electronic writing devices included electronic writing tablets wherein a user may enter handwriting information using a stylus, such as commonly found on most commercially available PDAs. Furthermore, with the growth of tablet personal computers, there exists further technology using a stylus in conjunction with an electronic writing surface.

Another type of electronic input device includes a pen-based bar code reader which is wired to a portable electronic device, such that using an optical reader, the user may scan a bar code, commonly referred to as a contact scanner. These bar code devices typically have a lower resolution and suffer from an inability to accurately recreate the encoded bar code, based on inaccuracies in the user's displacement of the scanning pen relative to the bar code itself, as this device does not measure a motion displacement signal for when the bar code is scanned.

One available technology for overcoming contact-based bar code scanning was developed by OTM, Technologies Ltd., as discussed in U.S. Pat. No. 6,452,683 using a displacement signal to measure the speed at which the user reads the bar code, thereby allowing for the original bar code to be reconstructed using the encoded data and the displacement signal.

Other electronic writing devices provide for writing ink keystrokes on a special digital paper and the storage of keystrokes made by the writing device within an internal memory. Once the writing has been completed, the electronic writing device may be docked into a docking station such that the stored keystroke information may be downloaded to a computing device, and the previous ink-based writing may be electronically recreated.

With the emergence of interactivity in wireless device, there are current improvements in providing ease of user interface. Many wireless devices seek to improve a user's ability to enter information and more seamlessly interact with not only the wireless device itself, but also services, such as available through a communication network.

Most users of electronic devices are more familiar with utilizing writing devices for providing input. As technology improves, it is beneficial to allow users to seamlessly interact with wireless devices in accordance with known communication techniques, including incorporating handwritten keystroke movements to allow for input recognition.

BRIEF DESCRIPTION OF THE DRAWINGS

The invention will be more readily understood with reference to the following drawings wherein.

DETAILED DESCRIPTION OF THE INVENTION

Briefly, a system and method for interaction between an electronic writing device and a wireless device includes the electronic writing device being capable of generating a keystroke signal in response to, among other things, one or more simulated writing movements, wherein a simulated writing movement is a user-created movement with the electronic writing device that simulates a written character or keystroke. The electronic writing device further includes a motion sensor that generates a motion displacement signal, a toggle switch that generates an engagement signal, upon engagement, and a pressure sensor that generates a depression signal. The electronic writing device also includes a processor coupled to the motion sensor, the toggle switch and the pressure sensor, such that the processor may generate the keystroke signal. The keystroke signal includes at least one of the multiple possible input signals, the depression signal from the pressure sensor, the motion displacement signal, the engagement signal and a bar code signal generated by an optical source.

The system and method further includes the wireless device being capable of wirelessly receiving the keystroke signal from the electronic writing device and thereupon executing an operation in response to the keystroke signal. The wireless device is capable of receiving the keystroke signal from the electronic writing device and includes a processor that may thereupon execute an operation in response to the keystroke signal. The wireless device also includes a display device capable of displaying a resulting feature of the keystroke signal, such as a corresponding keystroke character.

Figure 1:
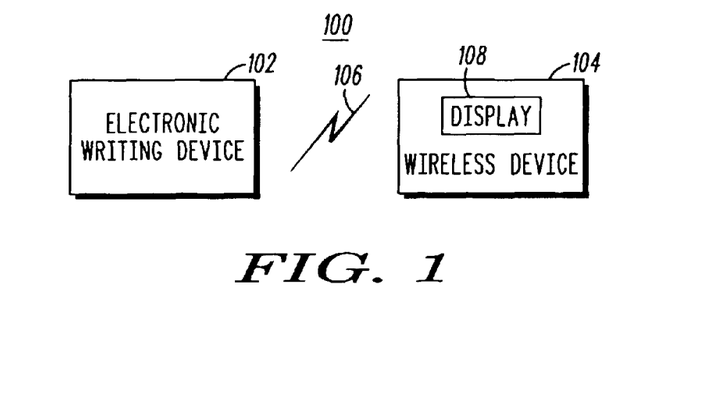
FIG. 1 illustrates one example of a system for interaction between an electronic writing device and a wireless device.

More specifically, FIG. 1 illustrates a system 100 for electronic interaction between an electronic writing device 102 and a wireless device 104. As discussed below with regards to FIG. 2, in one embodiment, the electronic device 102 includes functionality such as discussed in U.S. Pat. No. 6,452,683. Among other things, the writing device 102 generates a keystroke signal 106 that is received by the wireless device 104. In one embodiment, the keystroke signal 106 may be transmitted using a wireless transmission, such as a Bluetooth or IEEE 802.11x family of wireless transmissions. As discussed below with respect to FIG. 4, the wireless device 104 includes a display 108, such as a liquid crystal display (LCD), a speaker, an output port, or any other device capable of providing an output, as recognized by one having ordinary skill in the art.

Figure 2:
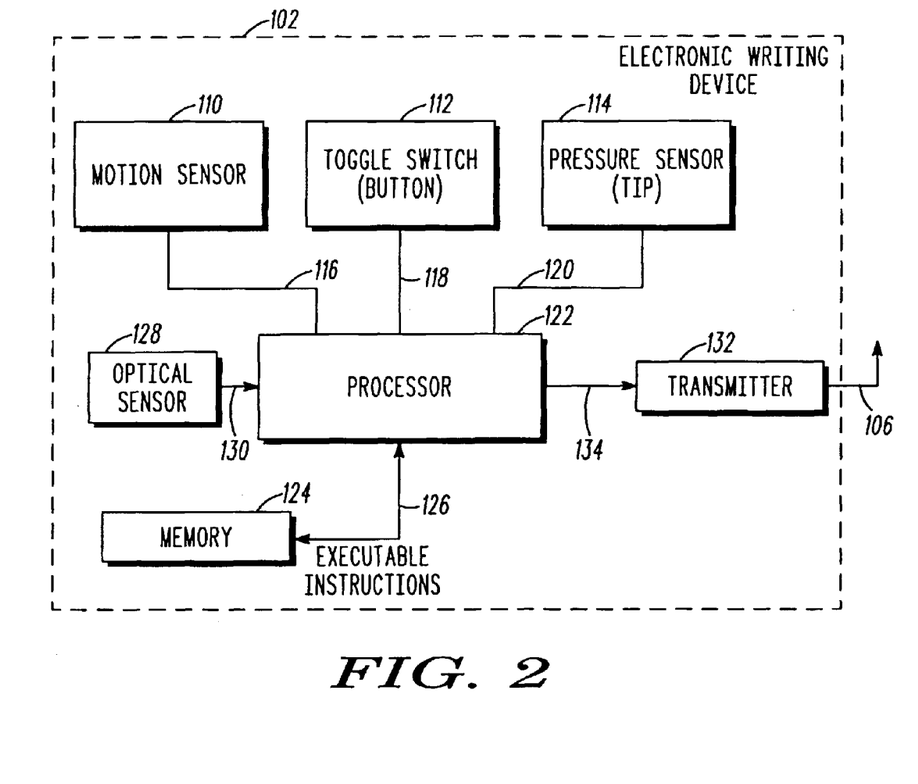
FIG. 2 illustrates one example of the electronic writing device.

FIG. 2 illustrates the electronic writing device 102 in block diagram form. The electronic writing device 102 includes a motion sensor 110, a toggle switch 112, and a pressure sensor 114. The motion sensor 110 operates in accordance with the motion sensor described in U.S. Pat. No. 6,452,683 issued to Kim et al., assigned to OTM Technologies, Ltd., generating a motion displacement signal 116. The toggle switch 112 may be a button or any other suitable type of toggle switch allowing for the activation and generation of an engagement signal 118 when the toggle switch 112 is engaged. The pressure sensor 114 may be disposed on a tip of the electronic writing device 102 for generation of a depression signal 120 when the pressure sensor senses being depressed against a surface, such as a writing tablet.

The electronic writing device 102 also includes a processor 122 capable of receiving the motion displacement signal 116, the engagement signal 118 and the depression signal. The processor 122 may be, but not limited to, a single processor, a plurality of processors, a DSP, a microprocessor, ASIC, state machine, or any other implementation capable of processing and executing software or discrete logic or any suitable combination of hardware, software and/or firmware. The term processor should not be construed to refer exclusively to hardware capable of executing software, and may implicitly include DSP hardware, ROM for storing software, RAM, and any other volatile or non-volatile storage medium.

The processor 122 is operably coupled to a memory 124 capable of providing executable instructions 126 to the processor 122. The memory 124 may be, but not limited to, a single memory, a plurality of memory locations, shared memory, CD, DVD, ROM, RAM, EEPROM, optical storage, or any other non-volatile storage capable of storing digital data for use by the processor 122.

In one embodiment, the electronic writing device 102 further includes an optical sensor 128, such as, but not limited to, a photo diode, coupled to the processor 122. The optical sensor 128 is capable of projecting an optical signal and reading a bar code output based on the reflection of the signal. The optical sensor 128 is capable of generating a bar code signal 130, which is provided to the processor 122. The processor 122, in one embodiment, incorporates the bar code signal 130 when generating the keystroke signal 106, while operating in a bar code mode. Otherwise, while operating in a normal mode, the processor 122 generates the keystrokes signal 106 using at least one or more the motion displacement signal 116, the engagement signal 118 and the depression signal 120. Regardless thereof, the optical sensor 128 works in accordance with known optical sensor technology.

The electronic writing device 102 also includes a transmitter 132 capable of receiving an encoded keystroke signal 134 and thereupon generating the keystroke signal 106 for transmission to the wireless device 104, as illustrated in FIG. 1. Furthermore, as recognized by one having ordinary skill in the art, many elements disposed within the electronic writing device 102 have been omitted for clarity purposes only. Moreover, in another embodiment, the keystroke signal 106 may be an executable command, wherein a character or keystroke recognition database, such as the memory 124, may be disposed within the electronic writing device 102 for interpreting the motion displacement signal 116, the engagement signal 118, the depression signal 120 and the bar code signal 130. In this embodiment, the processor 122 interprets the signals 116, 118, 120 and 130 and thereupon retrieves the executable command 126 to be transmitted to the wireless device 104.

Figure 3:
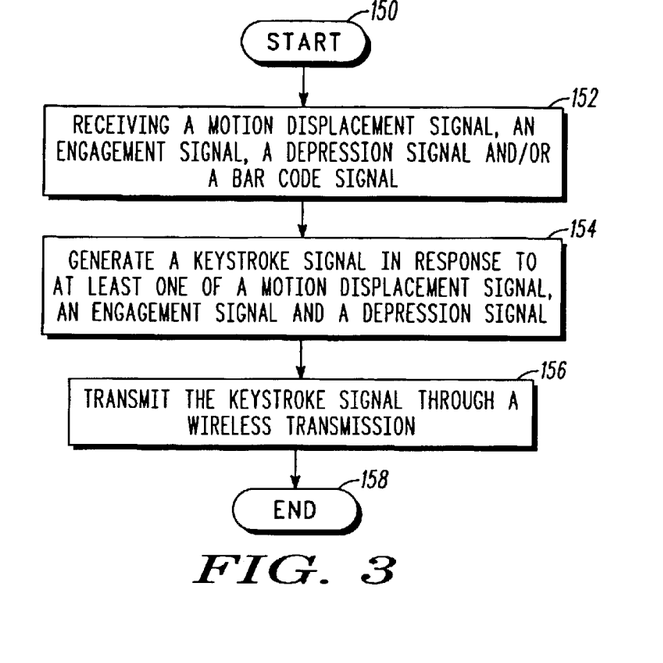
FIG. 3 illustrates an example of the steps of operation of the electronic writing device.

FIG. 3 illustrates a flow chart representing one example of the steps of operation of the electronic writing device 102 of FIG. 2. The method begins, step 150, by receiving a motion displacement signal, an engagement signal, a depression signal and/or a bar code signal, step 152. As discussed above, while operating in a normal mode, the processor 122 receives the motion displacement signal 116 from the motion sensor, the engagement signal 118 from the toggle switch 112 and the depression signal 120 from the pressure sensor 114. Furthermore, while operating in a bar code mode, the processor 122 also receives the bar code signal 130.

The method further includes generating a keystroke signal in response to at least one of the motion displacement signal, the engagement signal and the depression signal, step 154. Thereupon, the electronic writing device 102 may transmit the keystroke signal through a wireless transmission, step 156. In one embodiment, the keystroke signal 106 is provided to the wireless device 104, wherein the keystroke signal represents an input generated by the movement of the electronic writing device, such as a keystroke movement, pressing of the pressure sensor, pressing of the toggle switch or any combination of actions, combined by the processor 122 through the incoming signals 114, 116 and 118. Thereupon, from the perspective of the electronic writing device 102, the method is complete 156 and the keystroke signal 106 is provided to the wireless device 104.

Figure 4:
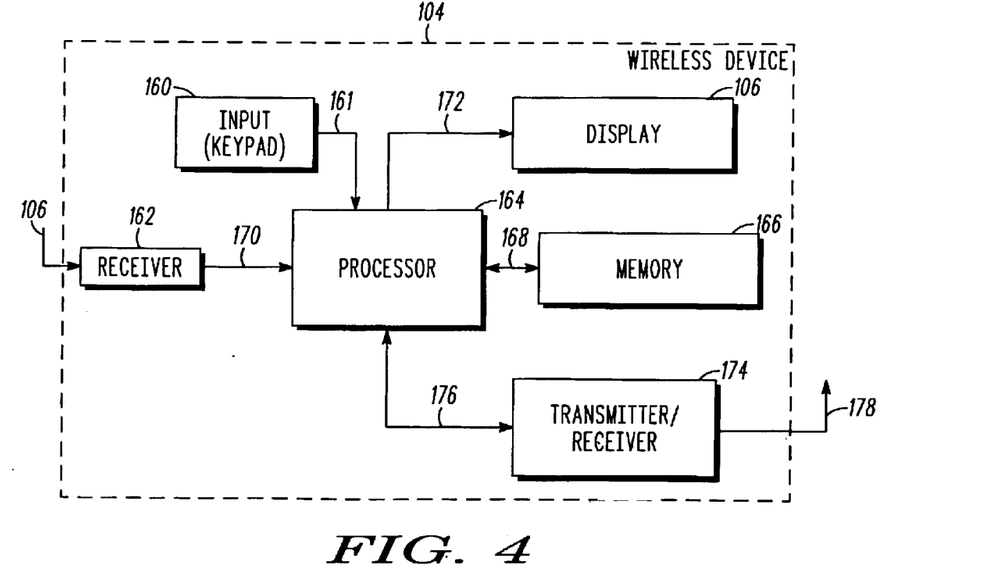
FIG. 4 illustrates one example of the wireless device.

FIG. 4 illustrates an example, in block diagram form, of the wireless device 104. The wireless device includes the display 106, an input 160 that generates an input signal 161, such as a keypad, a receiver 162 capable of receiving the keystroke signal 106 and a processor 164 operably coupled to the display 106, the input 160 and the receiver 162. The processor 164 may be, but not limited to, a single processor, a plurality of processors, a DSP, a microprocessor, ASIC, state machine, or any other implementation capable of processing and executing software or discrete logic or any suitable combination of hardware, software and/or firmware. The term processor should not be construed to refer exclusively to hardware capable of executing software, and may implicitly include DSP hardware, ROM for storing software, RAM, and any other volatile or non-volatile storage medium.

The processor 164 is operably coupled to a memory 166 capable of providing executable instructions 168 to the processor 164. The memory 166 may be, but not limited to, a single memory, a plurality of memory locations, shared memory, CD, DVD, ROM, RAM, EEPROM, optical storage, or any other non-volatile storage capable of storing digital data for use by processor 164.

In one embodiment, the receiver 162 generates a received keystroke signal 170, which includes the keystroke signal 106 with the removal of any transmission information, such as transmission header information or other encoding as recognized by one having ordinary skill in the art. The processor 164, in response to the keystroke signal 106, executes an operation. In one embodiment, the keystroke signal 106 is compared with a keystroke database (not illustrated) and the instructions for the corresponding operation are providing to the processor 164, such as through the memory 166. For example, the keystroke 106 may represent the entering of a number, such as the number 3, by providing a motion displacement signal indicating the writing of the number 3, the processor 164 may provide an output signal 172 to the display 106 for displaying the number 3 thereon.

The wireless device 104 also includes a transmitter/receiver 174 such that the wireless device 104 may provide for further communication. The transmitter/receiver 174 operates in accordance with known transmission and reception techniques used in conjunction with the wireless device 104. The processor provides and/or receives a communication signal 176, such that the transmission/receiver 174 may transmit and/or receive a transmission signal 178.

Figure 5:
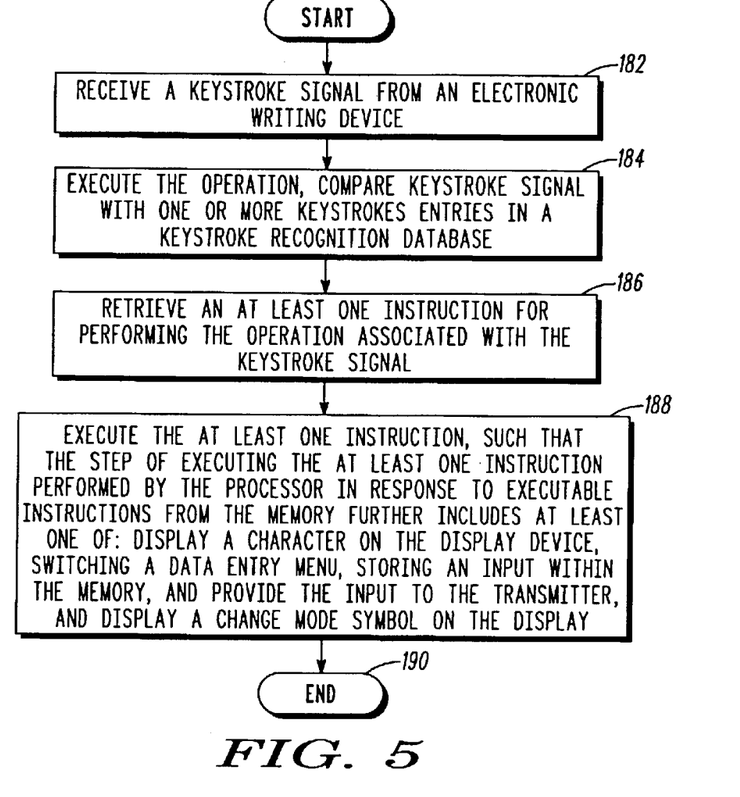
FIG. 5 illustrates example of the steps of operation of the wireless device.

FIG. 5 illustrates an example of the steps of one embodiment of the operation of the wireless device 104. The method begins, step 180, by receiving a keystroke signal from an electronic writing device, step 182. As discussed above, the keystroke signal 106 is received by the receiver 162 and provided to the processor 164. The next step, step 184, includes executing an operation as indicated by comparing the keystroke signal with one or more keystroke entries in a keystroke recognition database. As discussed below FIGS. 9–13 illustrates five separate examples of keystroke recognition database entries.

The method further includes retrieving at least one instruction for performing the operation associated with the keystroke, such as an executable instructions 168 provided the processor 164, step 186. Thereupon, the wireless device 106 provides for the executing of the instruction which may be any operation able to be performed by the wireless device, such as, but not limited to, displaying a character on the display device, switching a data entry menu and displaying a change of mode indicator, storing an input within the memory or providing the input to the transmitter/receiver, step 188. In one embodiment, the change of mode indicator may by any suitable character, or combination of characters, that provide a visual indication of a change in mode, such as a change in data entry mode, wherein a keystroke signal may be interpreted differently, as discussed with greater detail below. Thereupon, the method is complete 190.

Figure 6:
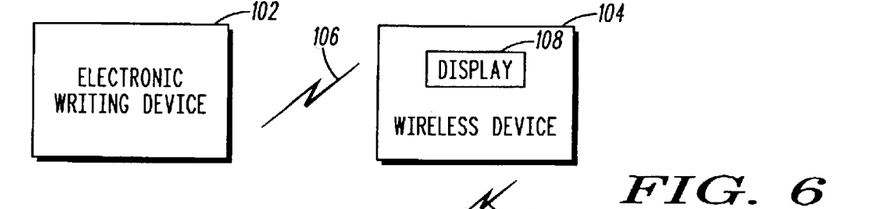
FIG. 6 illustrates another example of the system for interaction between the electronic writing device the wireless device.

FIG. 6 illustrates an example of the system illustrated in FIG. 1, further including a communication server 192 operably coupled to a content server 196 and operably coupleable to a portable device 198, such as a wireless device. The communication server 192 may be any suitable communication device for allowing the reception and transmission of communication information 202 from the wireless device 198, such as, but not limited to, a CDMA cellular base station. The communication server 192 provides communication with the content server 196 via communication path 200, which may be a wired or wireless communication path. The content server 196 may be a commercially available server, a proprietary network, any other suitable combination of servers and proxies for providing transfer and transmission of communication information, such as a Universal Resource Locator (URL) therethrough.

The communication server 192 is also in communication with the portable device 198 across communication path 202, which may be a wired or wireless communication path. In one embodiment, if the wireless device 104 provides for communication with the portable device 198, the communication server 192 provides for communication therethrough via communication paths 194 and 202. Also, as recognized by one having ordinary skill in the art, the wireless device 104 may also be in communication with the portable device 198 through a direct wired or wireless connection, such as within a wireless local area network.

In one example, a user, through the electronic writing device 102, may generate a keystroke 106 providing for the access of a specific URL, such as a commercial website or personal Internet location. The wireless device 104 receives the keystroke signal 106 and provides a data request through the communication server 192, which provides the request to the content server 196 via communication path 200. In response thereto, request data may be retrieved and provided back to the wireless device 104, whereupon it may be displayed upon the display 108. It is also within the embodiment for the electronic writing device 102 to contain the specific URL and provide the URL to the wireless device 104, whereupon the wireless device 104 facilitates access to the content server 196 via the communication server 196.

Figure 7:
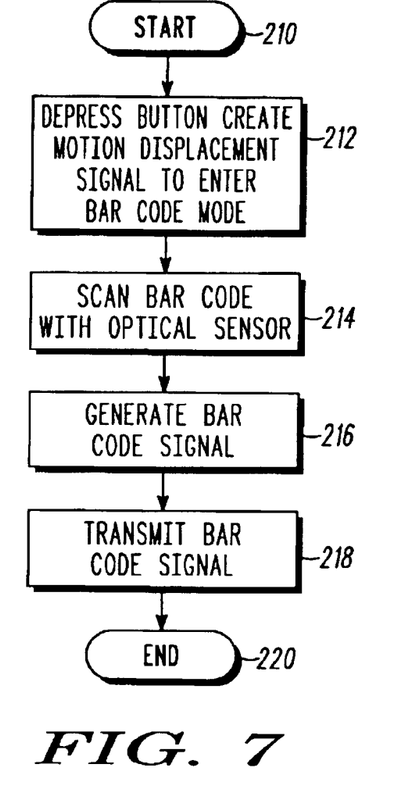
FIG. 7 illustrates one example the steps of operation of the electronic writing device operating in a bar code mode.

As discussed above, the electronic writing device 102 may operate in a normal mode and in a bar code made. The wireless device 104 may operate in a bar code mode, such that the keystroke signal 106 includes bar code information. FIG. 7 illustrates an example of the steps of operation of the electronic writing device 102 when operating in a bar code mode. The method begins, step 210, by depressing a button and generating a motion displacement signal, such as the keystroke "B", to enter bar code mode, step 212. For example, the toggle switch 112 may be engaged such that the engagement signal 118 indicates the transition to bar code mode. The next, step 214, includes scanning a bar code with an optical sensor. As discussed above, the optical sensor 128 generates the bar code signal 130 and the motion sensor 110 generates the motion displacement signal 116, which are provided to the processor 122.

The next step includes generating a bar code signal, step 216. In one embodiment, comparing the motion displacement signal with the bar code signal 130, to effectively recreate the original bar code, generates the bar code signal. The motion displacement signal indicate the speed at which the optical sensor 128 passes over the bar code, such that the bars having varying widths may be properly measured, thus insuring the integrity of bar code signal. Once generated, the bar code signal may be transmitted to the wireless device 104, step 218. Thereupon, the method is complete, step 220.

In another embodiment, based on processing availability and power consumption requirements, the motion displacement signal 116 and the bar code signal 130 may be encoded within the keystroke signal 106 such that the wireless device 104 may regenerate the bar code, instead of being generated by the electronic writing device 102.

Figure 8:
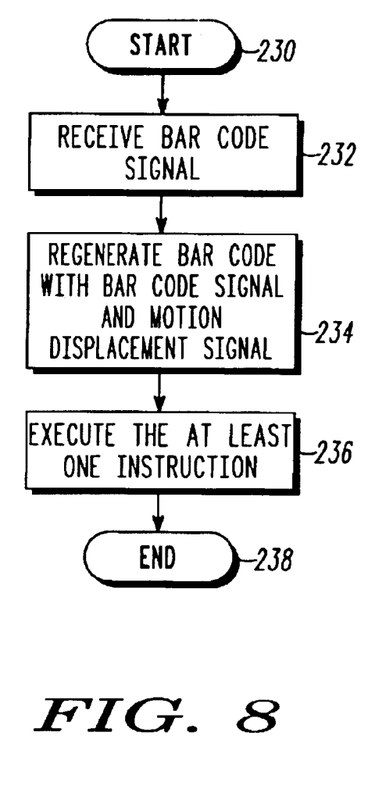
FIG. 8 illustrates one example of the steps of operation of the wireless device operating in a bar code mode.

FIG. 8 illustrates an example of the steps of a method of the wireless device 104 operating in a bar code mode. The method begins, step 230, by receiving a bar code signal, step 232. As discussed above, the bar code signal includes the motion displacement signal 116 and the bar code signal 130 provided from the optical sensor 128. The bar code signal received by the wireless device 104 may be encoded within the keystroke signal 106. The next step of the method includes regenerating the bar code using the bar code signal 130 and the motion displacement signal 116, step 234.

Upon regeneration through calculating the bar code signal 130 relative to the motion displacement signal 116, as discussed above, the wireless device executes at least one instruction in response thereto, step 236. In one example, if the bar code is directed to a Universal Product Code (UPC), the wireless device may display product information, such as price, available quantity information, the wireless device may communicate with a communication server to provide further information on the product, the wireless device may retrieve the product information from a database and add a product identifier to a catalog, such as a gift or wish list. Once the instruction has been executed, the operation is complete, step 238.

While operating in normal mode, the wireless device 102 may operate in subset modes directed to the input of various keystroke signals 106. For example, the wireless device may operate in an alpha mode, a numeric mode, a cursor mode, a shortcut mode and a punctuation mode. Through the display 108, a user may also provide various keystroke signals 106 to also adjust between modes, thereupon the wireless device 102 may provide a direct visual feedback of the various modes of operation with the change of mode indicator. For example, a change of mode indicator may be a character, such as a bar, and a letter or other character disposed under the bar, such as a letter "B" for the bar code mode of operation, the letter "N" for numeric mode of operation and the letter "S" for shortcut mode of operation.

Figure 9:
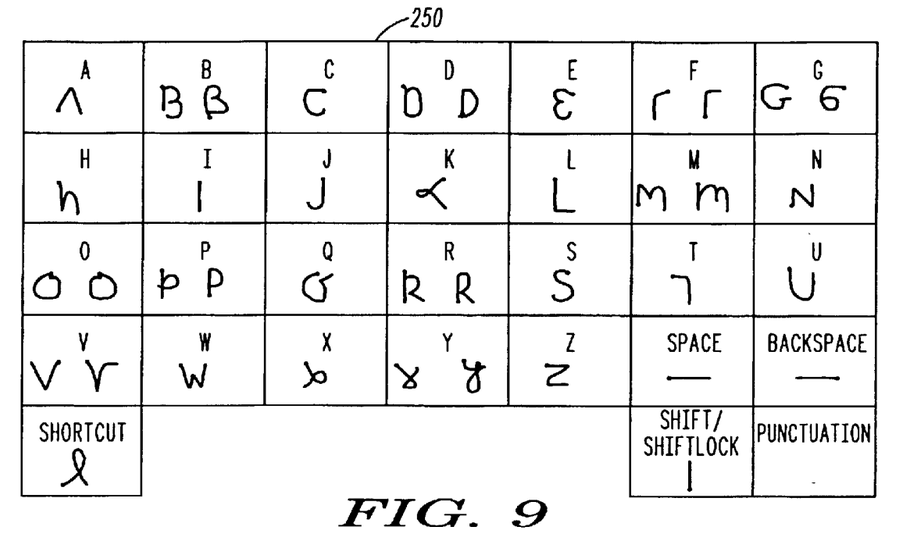
FIG. 9 illustrates an example of alpha entries in a keystroke recognition database.
Figure 10:
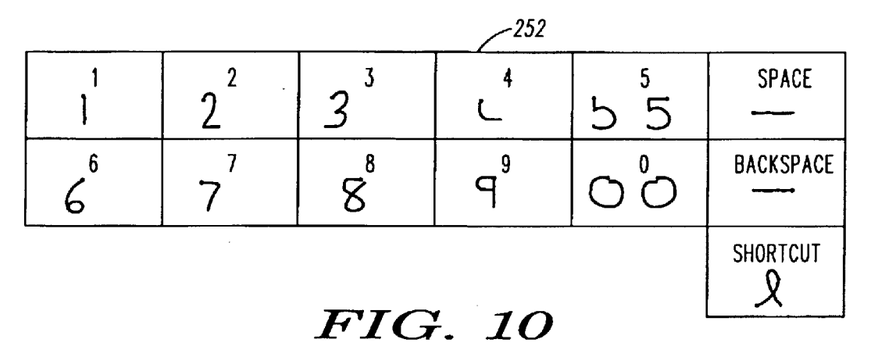
FIG. 10 illustrates an example of numeric entries in a keystroke recognition database.

FIGS. 9–13 illustrates examples of possible keystroke character sets that may be represented for specific operations by the wireless device 104, more specifically the processor 164. For illustration purposes only, FIG. 9 illustrates sample keystrokes 250 when operating in an alpha mode and FIG. 10 illustrates sample keystrokes 252 when operating in a numeric mode, wherein during the alpha mode and numeric mode, the electronic writing device 102 provides for the entrance of alpha and numeric characters.

Figure 11:
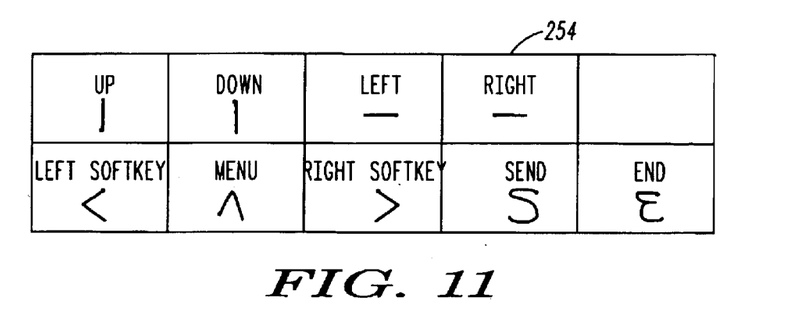
FIG. 11 illustrates an example of keystroke entries in a keystroke recognition database.
Figure 12:
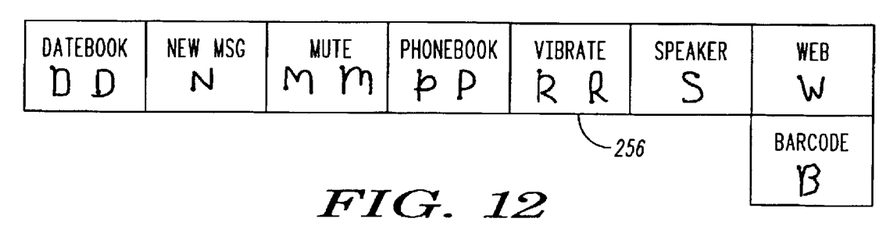
FIG. 12 illustrates an example of shortcut entries in a keystroke recognition database.
Figure 13:
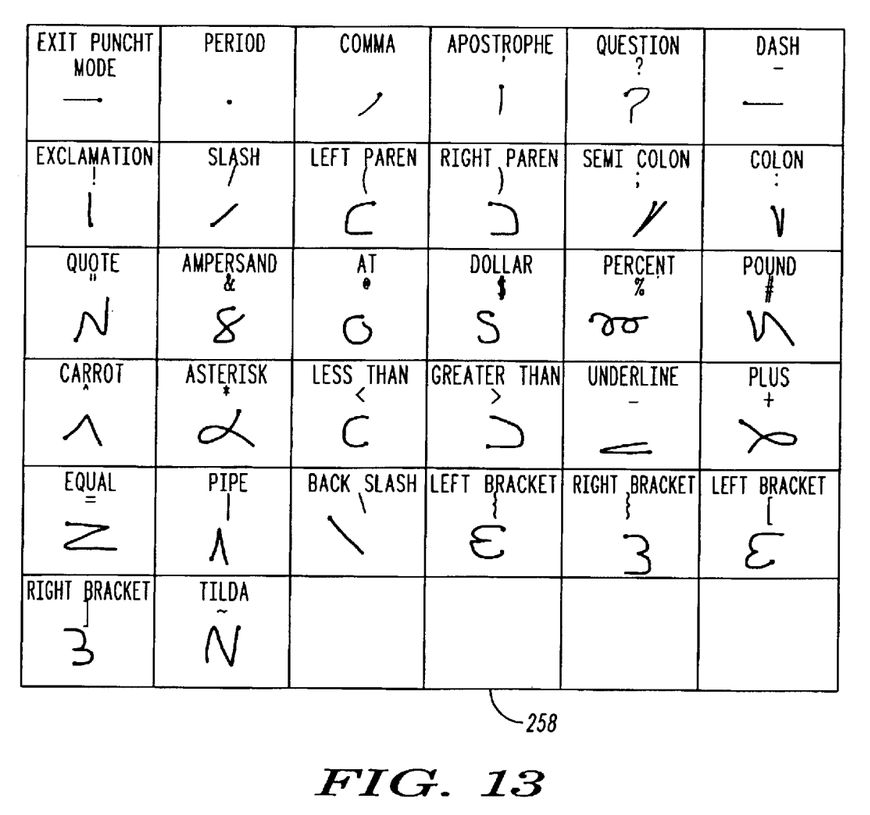
FIG. 13 illustrates an example of punctuation entries in a keystroke recognition database.

FIG. 11 illustrates sample keystrokes 254 for operating in a cursor mode, wherein during a cursor mode, a user may navigate through menus and simulate cursor commands based on keystrokes. FIG. 12 illustrates sample keystrokes 256 that may provide for shortcuts in operation of the wireless device 104. FIG. 13 illustrates sample keystrokes 258 for operation in a punctuation mode, wherein during the punctuation mode, the electronic writing device 102 may be used to generate keystroke signals 106 that represent various punctuations.

Also, as recognized by one having ordinary skill in the art, the electronic writing instrument 102 may provide for adjusting between the different subset modes through the combination of different keystrokes, through the motion displacement signal 116, engagement of the toggle switch 112 to provide the engagement signal 118 and the depression signal generated by the pressure sensor 114. The wireless device 104 may provide for a database of recognizable keystroke signals 106 to adjust modes and/or mode subsets or in another embodiment, the electronic writing device 102 may generate a mode subset change signal based on the input signal, 116, 118 and 120, and provide a keystroke signal 106 that instructs the wireless device 104 to change subset modes. Moreover, in another embodiment, the change in subset modes may be determined by the processor 122 for providing the keystroke signal 106 as represented by the exemplary sample keystrokes of FIGS. 9–13.

Figure 14:
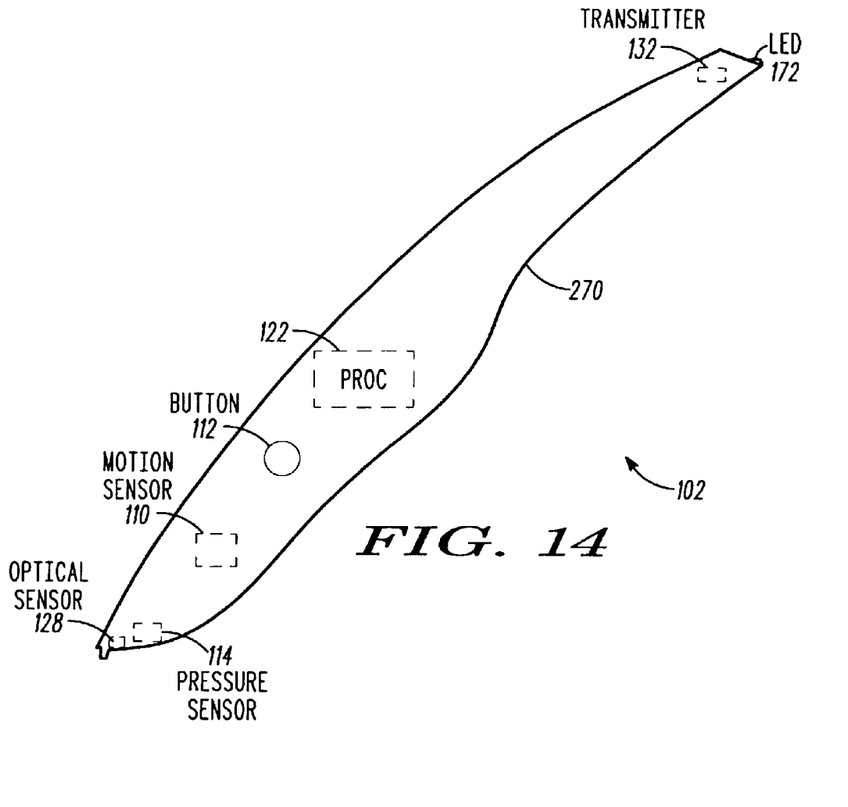
FIG. 14 illustrates a plan view of the electronic writing device.

FIG. 14 illustrates a plan view of one embodiment of the electronic writing device 102 having an outer casing 270 disposed in an ergonomic shape. Disposed within the electronic writing device 102, shown in shadow format, are the pressure sensor 114, the optical sensor 128, the processor 122 and the transmitter 132. Visible on the outer casing 170 is the button 112 and an LED 172, which may provide for visual feedback of the operation of the electronic writing device 102. As recognized by one having ordinary skill in the art, the electronic writing device 102 may also contain further LEDs to provide for a higher level of interactivity and visual feedback with an end user.

As such, the system and method for interaction between the electronic writing device 102 and the wireless device 104 provide for a greater level of interactivity for the wireless device 104, allowing for the input of commands using the electronic writing device 102. The system and method also allows for the input of a bar code using the electronic writing device 102 and in combination with the wireless device 104, allows for a greater level of interactivity and furthers the ability for gathering bar code based information and subsequent actions by the wireless device 104 upon generation of the bar code information, such as accessing a commercial server to gather product information related to a UPC bar code.

Figure 15:
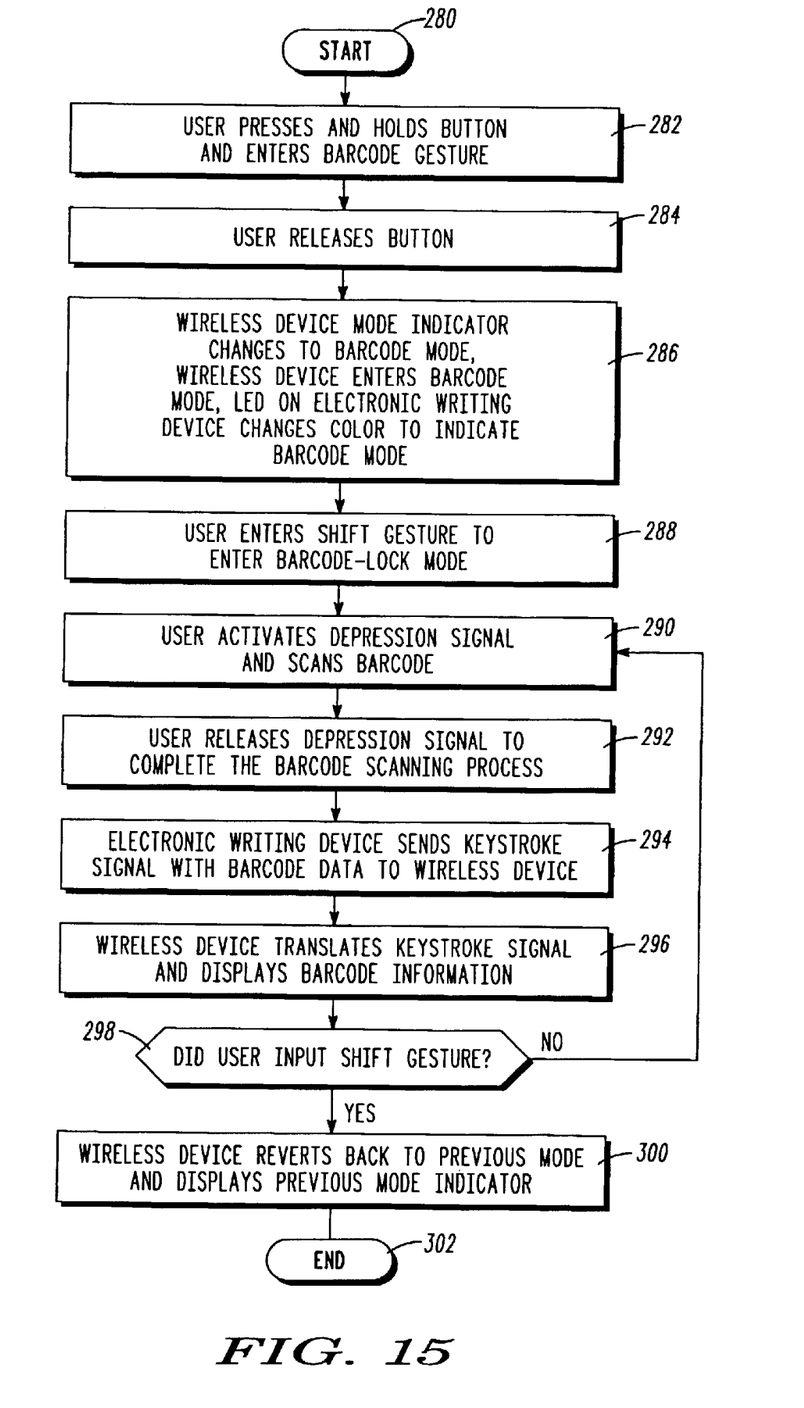
FIG. 15 illustrates a example of the steps of a method for operating in a barcode lock mode.

FIG. 15 illustrates the steps of another embodiment of utilizing the electronic writing device 102 and the wireless device 104 for operating in a bar code lock mode. The method begins, step 280, when an end user presses the button 112 to generate an engagement signal and generates a motion displacement signal through the motion sensor 110 to indicate the switching to the bar code mode, step 282. In another embodiment, the user may also generate a depression signal via the pressure sensor 114, such that the keystroke signal is the combination of the depression signal, the motion displacement signal and the engagement signal.

The next step, step 284, the end user releases the button 112, such that in one embodiment, another keystroke signal having null values for the engagement signal, the depression signal, the motion displacement signal and the bar code signal is generated. Thereupon, the wireless device 104 changes to bar code mode and the display 108 on the wireless device 104 provides a visual indication of the operation in bar code mode and/or the LED 172 on the writing device 102 may illuminate to indicate the change in mode, step 286.

The end user may thereupon enter a shift gesture, such as illustrated in FIG. 11, to enter into a barcode lock mode, step 288. Then, using the electronic writing device 102, the end user may press the button 112 to generate a depression signal and scan a bar code, generating a bar code signal with the optical sensor 128, step 290. The end user releases the button 112 to complete the bar code scanning, step 292. The electronic writing device 102 thereupon generates a keystroke signal including the bar code signal and the motion displacement signal generated by optical sensor 128 and the motion sensor 112, respectively, and provides this keystroke signal to the wireless device 104, via the transmitter 132, step 294.

The wireless device 104 may thereupon recreate the bar code from the keystroke signal and provide a visual display of the bar code information, or associated information, such as product information associated with a UPC bar code, step 296. The next step is a determination if the end user creates a gesture to unlock the bar code mode, step 298. If the bar code mode is not unlocked, steps 290 through 296 may be repeated until the bar code mode is unlocked. In one embodiment, the end user may continuously scan multiple bar codes, such as in an inventory situation.

Once the bar code mode is unlocked, the wireless device 104 may revert back to a previous mode and thereupon provide a visual indicator on the display 108 of this change in mode, step 300. Furthermore, the LED 172 may change colors to further indicate the mode change. As such, the wireless device 104 may contain multiple bar codes having been scanned using the electronic writing device while operating in the lock mode. In one embodiment, the wireless device 104 may compile and transmit the bar codes to a central server, such as an inventory server. In another embodiment, the combined bar codes may be provided to a memory device for storing a shopping list, such as a gift registry list or a grocery shopping list. Regardless thereof, once the end user generates the keystroke using a gesture to end the bar code lock mode and the wireless device switches operating modes, the method is complete, step 302.

It should be understood that there exists implementations of other variations and modifications of the invention and its various aspects, as may be readily apparent to those of ordinary skill in the art, and that the invention is not limited by the specific embodiments described herein. For example, the wireless device 102 may contain authentication abilities through one or more keystrokes to provides for a wireless transaction, such as a wireless purchase where an authorized electronic signature may be generated as a keystroke signal through the engagement signal, the depression signal, the motion displacement signal, and the bar code signal (which may have a null value). It is therefore contemplated and covered by the present invention, any and all modifications, variations, or equivalence to fall within the scope of the basic underlying principals disclosed and claimed herein.

What is claimed is:

1. An electronic interactive system comprising:
   an electronic writing device that generates a keystroke signal in response to one or more simulated writing movements, wherein the electronic writing device includes:
   an optical sensor capable of reading a bar code display;
   a transmitter coupled to a processor; and
   a memory operably coupled to the processor, the memory capable of storing executable instructions, wherein the processor, in response to executable instructions:
   generates the keystroke signal in response to at least:
   a motion displacement signal, an engagement signal and a depression signal; and
   provides the keystroke signal to the transmitter; and
   a wireless device capable of receiving the keystroke signal and thereupon executing an operation in response to the keystroke signal, wherein the wireless device includes:
   a receiver that receives the keystroke signal from the electronic writing device;
   a processor operably coupled to the receiver such that the processor receives the keystroke signal and thereupon executes the operation in response thereto; and
   a display device capable of receiving a display signal from the processor, wherein the display device displays a mode indicator, such that the mode indicator indicates the mode of operation of the electronic writing device,
   wherein when the processor is operating in a bar code mode, the receiver receives the keystroke signal having a motion displacement signal and a bar code signal such that the processor can, based on the combination of the motion displacement signal and the bar code signal, regenerate a bar code scanned by an optical sensor on the writing device.

2. The system of claim 1 wherein the electronic writing device comprises:
   a motion sensor that generates the motion displacement signal;
   a toggle switch that, upon engagement, generates the engagement signal;
   a pressure sensor disposed on a tip of the electronic writing device such that the pressure sensor generates the depression signal when the tip is depressed against a surface; and
   the processor operably coupled to the motion sensor, the toggle switch and the pressure sensor such that the processor receives the motion displacement signal, the engagement signal and the depression signal.

3. The system of claim 2 wherein the writing device generates a bar code signal such that when the writing device is operating in a bar code mode, the keystroke signal includes the motion displacement signal and the bar code signal.

4. The system of claim 1 wherein the wireless device further comprises:
   a keystroke recognition database; and
   a memory operably coupled to the processor, the memory storing executable instructions such that the processor, in response to the executable instructions:
   compares the keystroke signal with the keystroke recognition database;
   retrieves an at least one instruction for performing the operation associated with the keystroke signal; and
   executes the at least one instruction.

5. The system of claim 4 wherein the step of executing the at least one instruction performed by the processor in response to executable instructions from the memory further includes at least one of: displaying a character on the display device, storing an input within the memory, providing the input to the transmitter, switching into an alphabetic mode, switching into a cursor mode, switching into a shortcut mode, switching into a shift/shiftlock mode, switching into a punctuation mode and switching into a bar code mode.

6. An electronic writing device comprising:
   a motion sensor that generates a motion displacement signal;
   a toggle switch that, upon engagement, generates an engagement signal;
   a pressure sensor disposed on a tip of the electronic writing device such that the pressure sensor generates a depression signal when the tip is depressed against a surface;
   an optical sensor capable of reading a bar code display and generating a bar code signal;
   a processor operably coupled to the motion sensor, the toggle switch and the pressure sensor such that the processor receives at least one of: the motion displacement signal, the engagement signal and the depression signal and the bar code signal, and in response thereto generates a keystroke signal;
   a transmitter coupled to the processor; and
   a memory operably coupled to the processor, the memory capable of storing executable instructions,
   wherein the processor, in response to executable instructions while operating in a bar code mode:

receives a bar code lock mode command;

generates a plurality of keystroke signals in response to the motion displacement signal and the bar code signal until a bar code mode unlock command is received; and provides the keystroke signal to the transmitter.

7. The electronic writing device of claim 6 further comprising:

a transmitter coupled to the processor; and a memory operably coupled to the processor, the memory capable of storing executable instructions, wherein the processor, in response to executable instructions:

generates the keystroke signal in response to at least: the motion displacement signal, and engagement signal and the depression signal; and provides the keystroke signal to the transmitter.

8. The electronic writing device of claim 6 wherein the processor, in response to the executable instructions:

generates a plurality of bar codes from the keystroke signals;

provides the plurality of bar codes to a central processing unit.

9. A wireless device comprising:

a receiver capable of receiving a keystroke signal from an electronic writing device, wherein the keystroke signal includes a depression signal, a bar code signal, an engagement signal and a motion displacement signal;

a processor operably coupled to the receiver such that the processor receives the keystroke signal and thereupon executes an operation in response thereto;

a display device capable of receiving a display signal from the processor;

a keystroke recognition database; and a memory operably coupled to the processor, the memory storing executable instructions such that the processor, in response to the executable instructions:

compares the keystroke signal with the keystroke recognition database;

retrieves an at least one instruction for performing the operation associated with the keystroke signal; and executes the at least one instruction.

10. The wireless device of claim 9 wherein the step of executing the at least one instruction performed by the processor in response to executable instructions from the memory further includes at least one of: displaying a character on the display device, storing an input within the memory, providing the input to the transmitter, switching into an alphabetic mode, switching into a cursor mode, switching into a shortcut mode, switching into a shift/shiftlock mode, switching into a punctuation mode and switching into a bar code mode.

11. The wireless device of claim 9 wherein when the processor is operating in a bar code mode, the receiver receives the keystroke signal having the motion displacement signal and the bar code signal such that the processor may, based on the combination of the motion displacement signal and the bar code signal, regenerate a bar code scan.

12. A method for electronic interaction comprising:

generating a keystroke signal in response to a motion displacement signal, an engagement signal and a depression signal;

transmitting the keystroke signal through a wireless transmission;

comparing the keystroke signal with one or more keystroke entries in a keystroke recognition database;

retrieving an at least one instruction for performing an operation associated with the keystroke signal; and executing the operation including the at least one instruction in response to the keystroke signal.

13. The method of claim 12 wherein the step of executing the at least one instruction further includes at least one of: displaying a character on the display device, switching a data entry menu, storing an input within the memory, and providing the input to the transmitter.

14. The method of claim 12 wherein the keystroke signal is further generated in response to a bar code signal and the method further comprising:

regenerating a bar code by processing the bar code signal relative to the motion displacement signal disposed within the keystroke signal; and executing at least one operation in response to the bar code, wherein the at least one operation includes at least one of: displaying a character on the display device, switching a data entry menu, storing an input within the memory, and providing the input to the transmitter.

15. An electronic interactive system comprising:

an electronic writing device that generates a keystroke signal in response to one or more simulated writing movements, wherein the electronic device includes:

a motion sensor that generates a motion displacement signal;

a toggle switch that, upon engagement, generates an engagement signal;

a pressure sensor disposed on a tip of the electronic writing device such that the pressure sensor generates a depression signal when the tip is disposed against a surface;

an optical sensor capable of reading a bar code display and generating a bar code signal;

a processor operably coupled to the motion sensor, the toggle switch and the pressure sensor such that the processor receives the motion displacement signal, the engagement signal, the depression signal, and the bar code signal;

a transmitter coupled to the processor; and a memory operably coupled to the processor, the memory capable of storing executable instructions, wherein the processor, in response to executable instructions;

generates the keystroke signal in response to the motion displacement signal, the engagement signal the depression signal and the bar code signal; and provides the keystroke signal to the transmitter, a wireless device capable of receiving the keystroke signal and thereupon executing an operation in response to the keystroke signal, wherein the wireless device includes:

a receiver that receives the keystroke signal from the electronic writing device;

a keystroke recognition database;

a processor operably coupled to the receiver such that the processor receives the keystroke signal;

a memory operably coupled to the processor, the memory storing executable instructions such that the processor, in response to the executable instructions;

compares the keystroke signal with the keystroke recognition database;

retrieves an at least one instruction for performing the operation associated with the keystroke signal; and executes the at least one instruction, such that the step of executing the at least one instruction performed by the processor in response to executable instructions from the memory further includes at least one of: displaying a character on the display device, storing an input within the memory, providing the input to the transmitter, switching into an alphabetic mode, switching into a cursor mode, switching into a shortcut mode, switching into a shift/shiftlock mode, switching into a punctuation mode and switching into a bar code mode; and a display device capable of receiving a display signal from the processor.

16. The system of claim 15 wherein when the writing device is operating in a bar code mode, the keystroke signal includes the motion displacement signal and the bar code signal; and when the processor is operating in a bar code mode, the receiver receives the keystroke signal having a motion displacement signal and a bar code signal such that the processor may, based on the combination of the motion displacement signal and the bar code signal, regenerate a bar code scan by an optical sensor on the writing device.

* * * * *